United States Patent [19]

Nee

[11] Patent Number: 5,431,187

[45] Date of Patent: Jul. 11, 1995

[54] BIDET WITH ANTI-SCALDING VALVE ASSEMBLY

[76] Inventor: Ming Z. Nee, 8411-15, Old Marlboro Pike, Upper Marlboro, Md. 20772

[21] Appl. No.: 235,537

[22] Filed: Apr. 29, 1994

[51] Int. Cl.⁶ .............................................. F16K 11/20
[52] U.S. Cl. ..................................... 137/599; 137/606
[58] Field of Search ............... 137/599, 605, 606, 607, 137/337; 236/12.13

[56] References Cited

U.S. PATENT DOCUMENTS

| | | |
|---|---|---|
| 2,080,438 | 4/1937 | Salvoni . |
| 2,296,266 | 9/1942 | Breckenridge ............... 137/607 X |
| 2,581,855 | 1/1952 | Griffith ........................ 137/606 X |
| 2,842,155 | 7/1958 | Peters ............................... 137/337 |
| 2,971,532 | 2/1961 | McLaren et al. . |
| 2,982,476 | 5/1961 | Witherspoon ................ 236/12.13 |
| 3,001,717 | 9/1961 | Rimsha et al. ................ 236/12.13 |
| 3,021,868 | 2/1962 | Kovach .......................... 137/599 X |
| 3,577,567 | 5/1971 | Wintercorn . |
| 3,605,124 | 9/1971 | Marcard et al. . |
| 4,068,325 | 1/1978 | Benthin . |
| 4,596,058 | 6/1986 | Nourbaksh . |
| 4,669,653 | 6/1987 | Avelöu ........................... 236/12.13 |
| 4,807,311 | 2/1989 | Ingels . |
| 4,926,509 | 5/1990 | Bass . |
| 4,953,238 | 9/1990 | Shifferly . |
| 4,998,300 | 3/1991 | Sharifzadeh . |
| 5,050,640 | 9/1991 | Cowley ............................... 137/606 |
| 5,205,313 | 4/1993 | Moretti ......................... 137/606 X |
| 5,350,112 | 9/1994 | Stein ................................ 236/12.13 |

*Primary Examiner*—Stephen M. Hepperle
*Attorney, Agent, or Firm*—Bacon & Thomas

[57] ABSTRACT

A bidet is disclosed which incorporates an anti-scalding mixing valve which automatically limits the temperature of the water emanating from the bidet spray nozzle so as to avoid discomfort for the user. The bidet has a spray arm with a spray nozzle pivotally attached to a mounting bracket structure which may be easily attached to a standard toilet. The bracket may be readily attachable to the toilet by the fasteners utilized to attach a standard seat to the toilet. An anti-scalding mixing valve is attached to the mounting bracket and has an outlet connected to an outlet tube which, in turn, is connected to the spray arm. A housing pivotally attached to the end of the outlet tube is attached to the end of the spray arm such that a linkage mechanism, readily accessible to the user, may pivot the spray arm relative to the outlet tube to move the spray nozzle between a retracted position and a use position. In the use position, the spray nozzle and spray arm extend into the toilet bowl, while in the retracted position, the spray arm is adjacent to the outer rim of the toilet bowl.

6 Claims, 7 Drawing Sheets

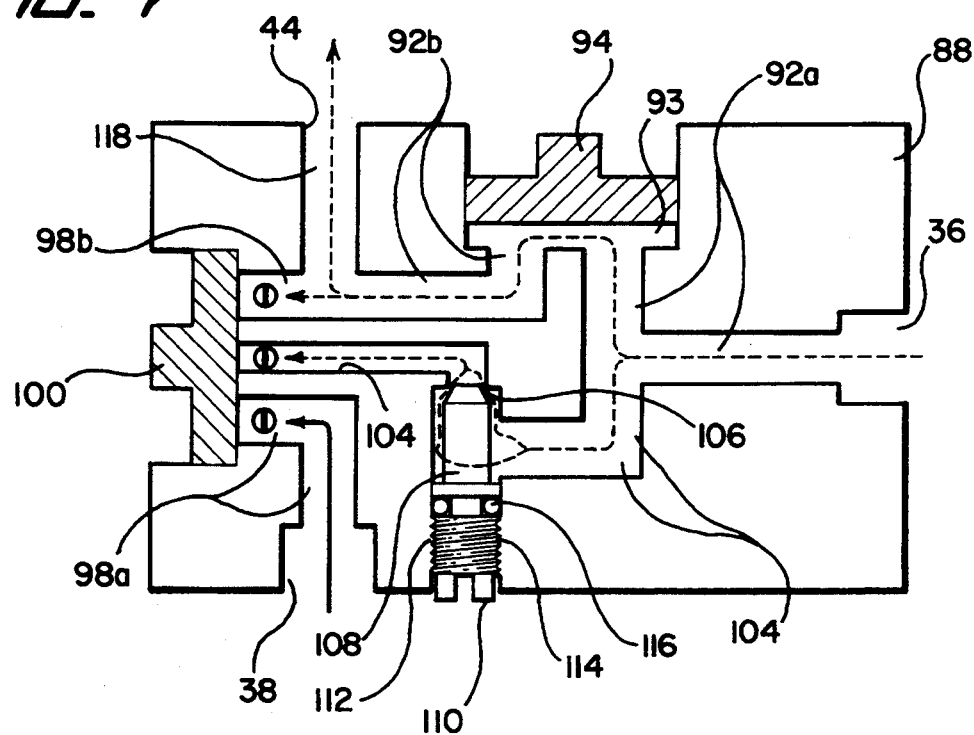
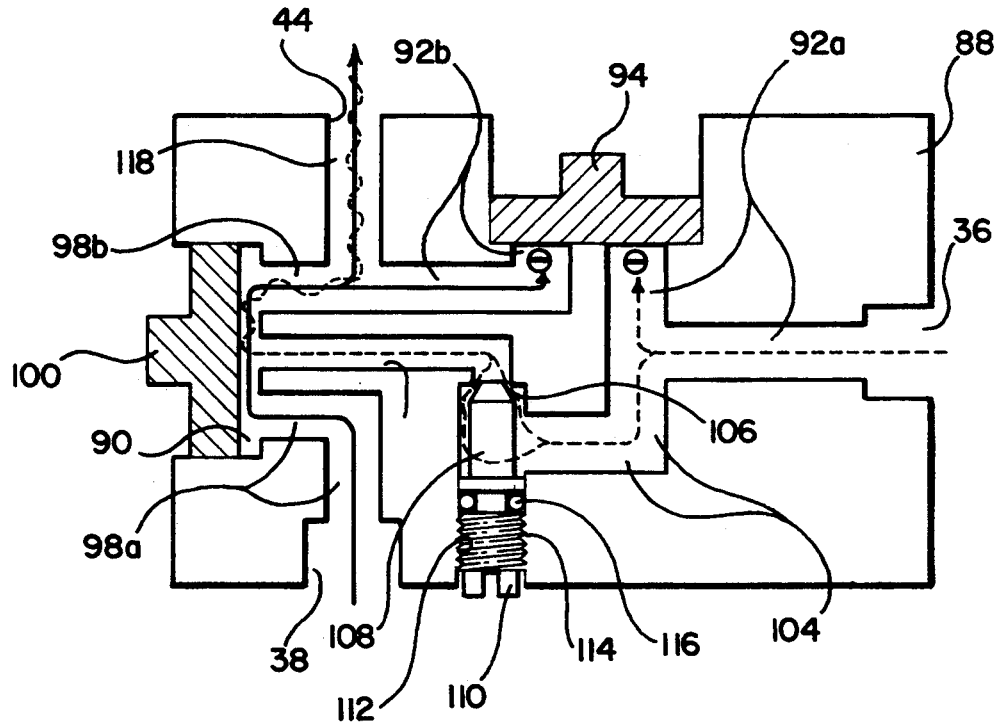

BIDET WITH ANTI-SCALDING VALVE ASSEMBLY

BACKGROUND OF THE INVENTION

The present invention relates to a bidet incorporating an anti-scalding valve connected to hot and cold fluid inlet lines, wherein the valve has means to automatically limit the temperature of the outlet fluid to less than the temperature of the hot inlet fluid.

Bidets, of course, as well known in the art and typically comprise a spray arm and nozzle assembly attached to a toilet bowl such that the arm and nozzle extend into to the toilet bowl. Bidets are also known which are easily connectable to standard toilets and which are also connectable to existing water supplies.

Quite obviously, some means must be provided to regulate the temperature of the water spraying from the nozzle in order to suit the individual tastes of the user. Known bidets may be connected solely to a cold water supply line and include an electric heating device to heat and regulate the temperature of the outlet water. While such devices generally function as intended, use of the electric heaters require an unacceptable amount of time for the water to reach the proper temperature and such use incurs the usual risks when electrical devices are used in close proximity to a water supply. In addition, such devices increase the electrical usage of the user's household.

It is also known to provide bidets with connections to both hot and cold water supply lines and to provide one or more regulating valves so that the user may adjust the temperature as desired. These systems also pose risks due to the inadvertent positioning of the hot and cold water supply valves, which may result in water emanating from the spray head which is at an unacceptably hot or cold temperature.

SUMMARY OF THE INVENTION

A bidet is disclosed which incorporates an anti-scalding mixing valve which automatically limits the temperature of the water emanating from the bidet spray nozzle so as to avoid discomfort for the user. The bidet has a spray arm with a spray nozzle pivotally attached to a mounting bracket structure which may be easily attached to a standard toilet. The bracket may be readily attachable to the toilet by the fasteners utilized to attach a standard seat to the toilet.

An anti-scalding mixing valve is attached to the mounting bracket and has an outlet connected to an outlet tube which, in turn, is connected to the spray arm. A housing pivotally attached to the end of the outlet tube is attached to the end of the spray arm such that a linkage mechanism, readily accessible to the user, may pivot the spray arm relative to the outlet tube to move the spray nozzle between a retracted position and a use position. In the use position, the spray nozzle and spray arm extend into the toilet bowl, while in the retracted position, the spray arm is adjacent to the outer rim of the toilet bowl.

A spray shield is also attached to the mounting bracket such that it extends into the toilet bowl adjacent to the nozzle when the nozzle is in the retracted position. Such a shield prevents the spray from contacting the user during use of the bidet until the water temperature reaches the desired level. At this point, the user may easily access the actuating mechanism to move the spray arm into the use position.

The anti-scalding mixing valve assembly is also attached to the mounting bracket so as to readily accessible to the user. The valve is connected to separate hot and cold water inlet lines and defines an outlet conduit which directs mixed hot and cold water into the outlet tube. Separate control valves communicate with the hot and cold water inlet conduits such that the flow of water through each conduit may be separately controlled by the user. Actuation of the separate control valves will separately control the flow of the cold water, or the mixed hot and cold water into the outlet tube. Opening the cold water valve opens a cold water control chamber and enables the cold water to flow from the cold water inlet into the outlet conduit. Opening the hot water control valve will open a hot water control chamber which enables the hot water inlet to communicate with the outlet conduit. However, the valve assembly defines a cold water bypass conduit which connects the cold water inlet to the hot water control chamber such that a portion of the cold water does not pass through the cold water control valve and, even should this valve be closed, a fixed quantity of cold water will mix with the hot water to reduce the temperature of the mixed water passing into the outlet tube. Both control valves contain manual manipulating knobs on the exterior of the mixing valve body such that both are readily accessible.

The invention also contemplates providing a bypass valve in incorporated into the valve body, which valve has a metering portion extending through an orifice such that the flow of bypass cold water may be adjusted. The bypass valve is not readily accessible to the exterior of the valve body in order to prevent inadvertent opening or closing of this valve which would result in unacceptably high or low water temperatures emanating from the valve. The bypass valve may be adjusted by a screw driver or the like extending into the valve body and, once adjusted, need not be further manipulated.

Once the bypass valve is adjusted, a portion of the incoming cold water flow will automatically bypasses the cold water flow control valve and pass directly into the hot water control chamber so that the temperature of the incoming hot water will be automatically modulated even if the user should inadvertently neglect to open the cold water inlet flow valve.

BRIEF DESCRIPTION OF THE DRAWINGS

FIG. 7 is a schematic view of the anti-scalding valve with the cold water control valve open and the hot water control valve closed.

FIG. 8 is a schematic view of the anti-scalding valve, similar to FIG. 7, but with the cold water control valve closed and the hot water control valve open.

DETAILED DESCRIPTION OF THE PREFERRED EMBODIMENT

Figure 1:
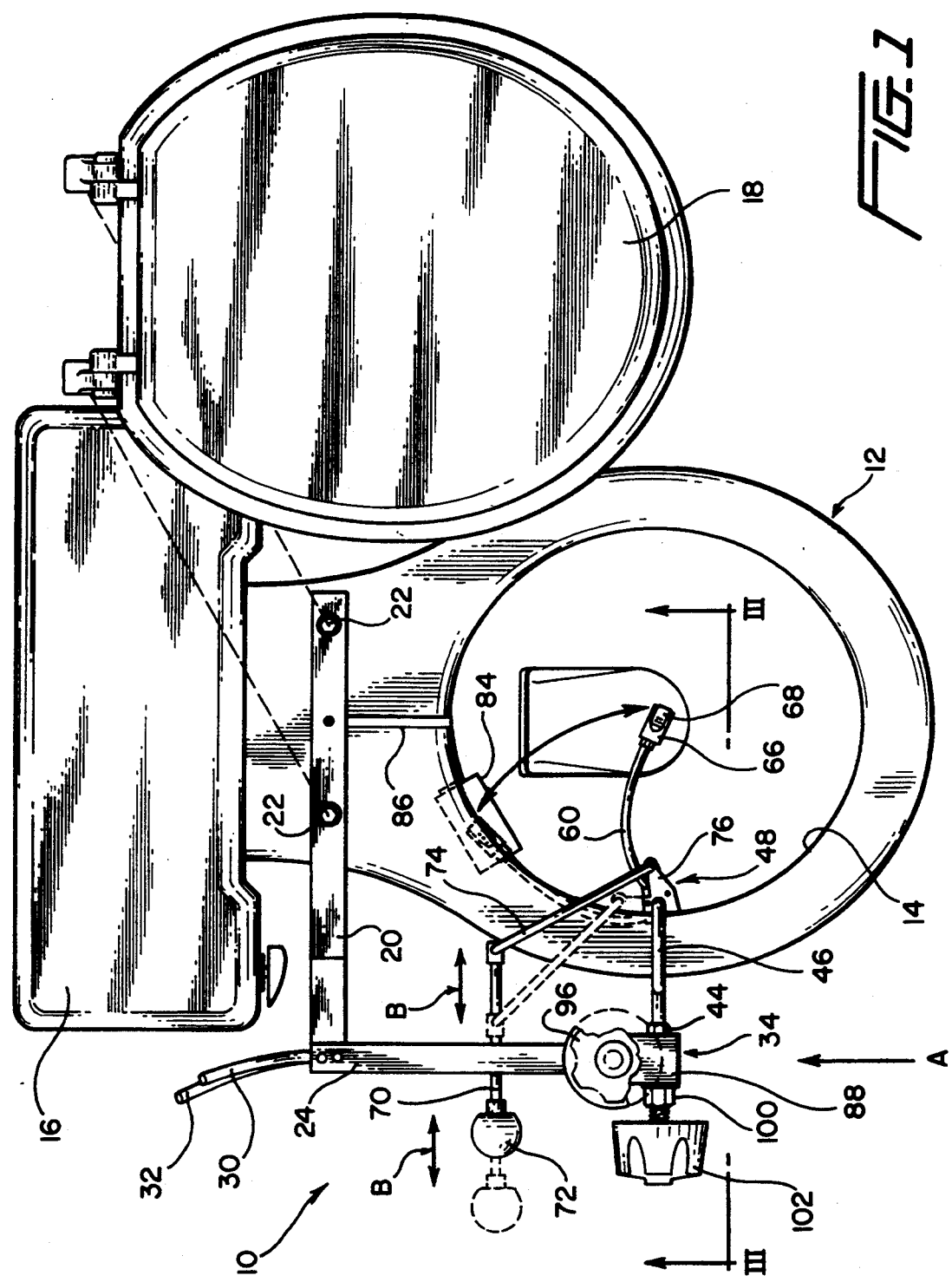
FIG. 1 is a partially exploded, top view of a standard toilet incorporating the bidet assembly according to the present invention.

As illustrated in FIGS. 1–4, the bidet assembly 10 according to the present invention may be attached to a standard toilet 12 which typically comprises a toilet bowl 14, a flush tank 16 and a seat assembly 18. The bidet assembly 10 comprises a first mounting bracket 20 which may be attached to the toilet 12 by the standard studs or bolts 22 which normally attach the seat assembly 18 to the toilet 12. As can be seen, one end of mounting bracket 20 extends laterally outwardly from the toilet bowl 12 and has attached to its distal end a second mounting bracket 24.

Figure 4:
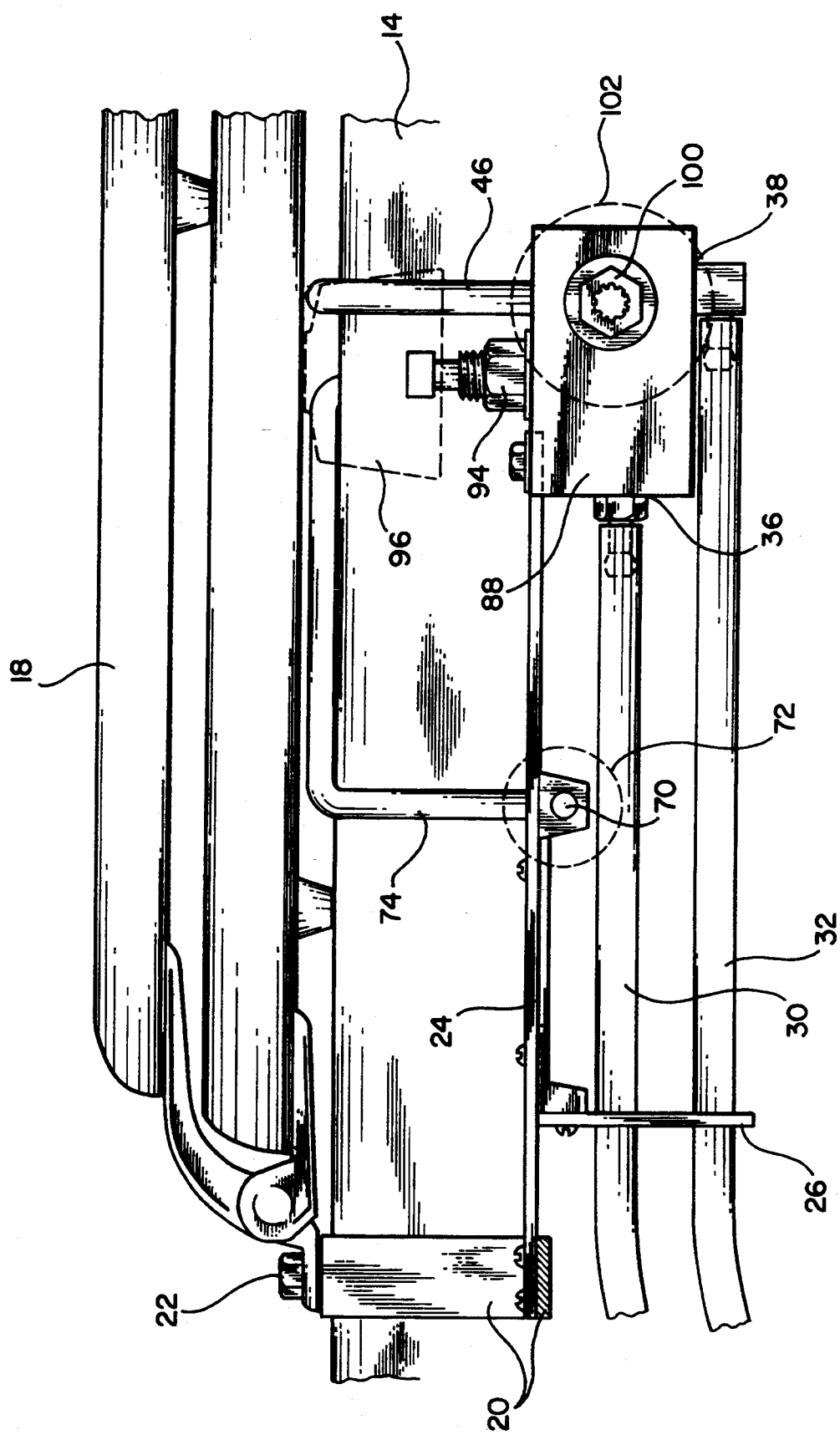
FIG. 4 is a side view of the bidet illustrated in FIG. 1.

As best illustrated in FIG. 4, the mounting bracket 24 has support means 26 which supports hot and cold water supply lines 30 and 32, respectively. The other end of the mounting bracket 24 has anti-scalding valve assembly 34 attached thereto. Valve assembly 34 has a cold water inlet 36 connected to the cold water supply line 30 and a hot water inlet 38 connected to the hot water supply line 32.

Figure 2:
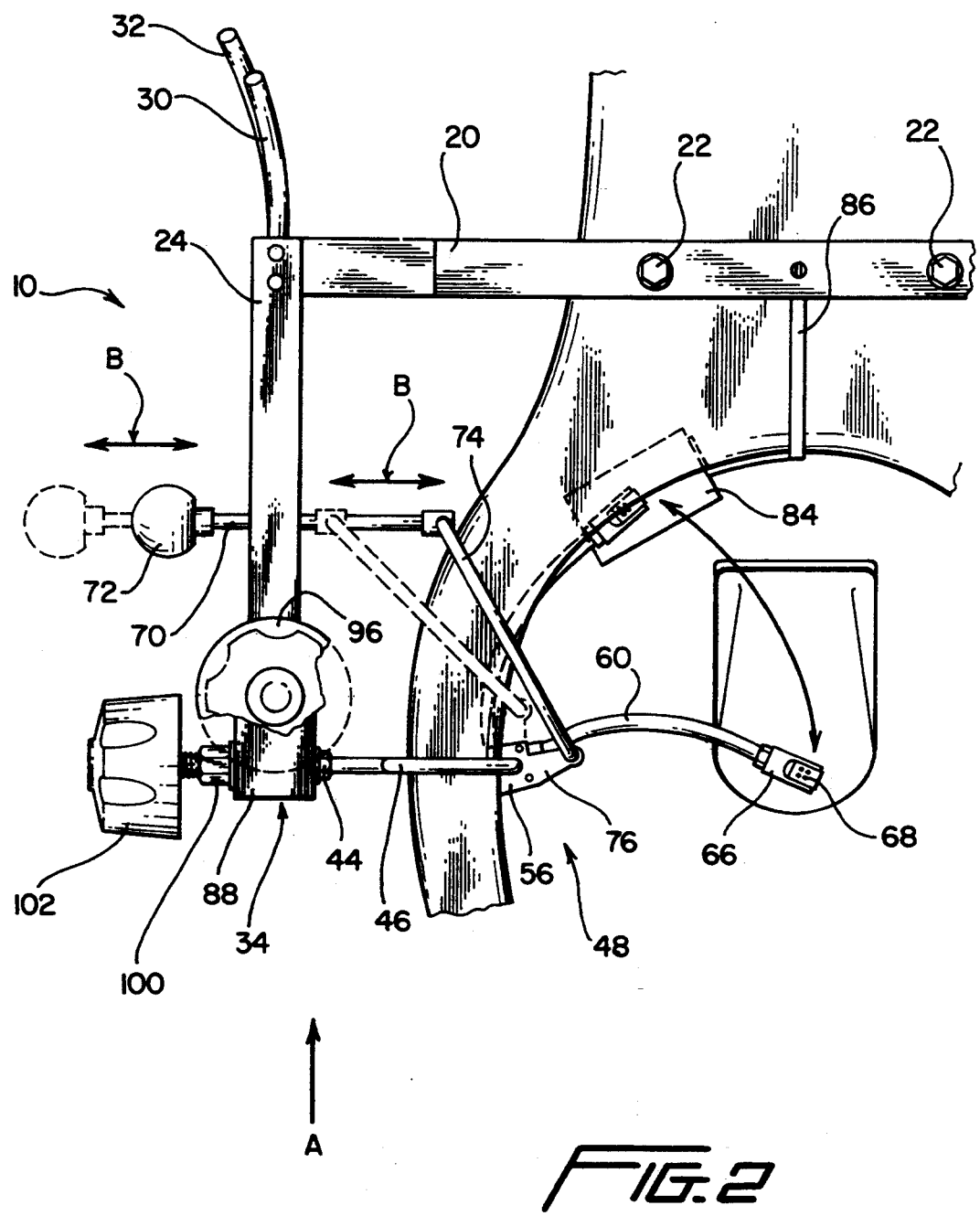
FIG. 2 is an enlarged, partial top view of the bidet illustrated in FIG. 1.
Figure 3:
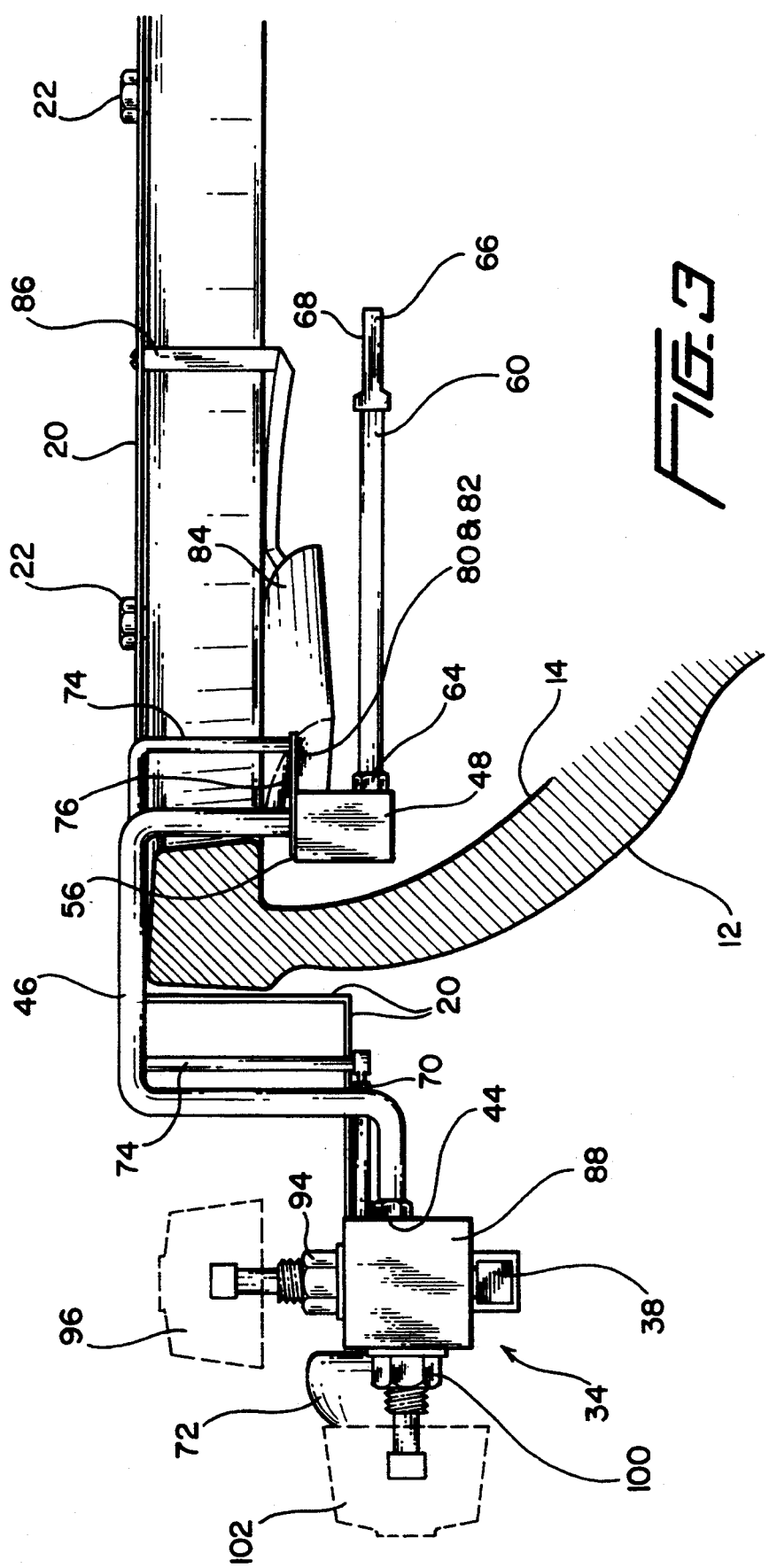
FIG. 3 is a partial, front view of the device according to the present invention viewed in the direction of arrow A in FIG. 2.
Figure 5:
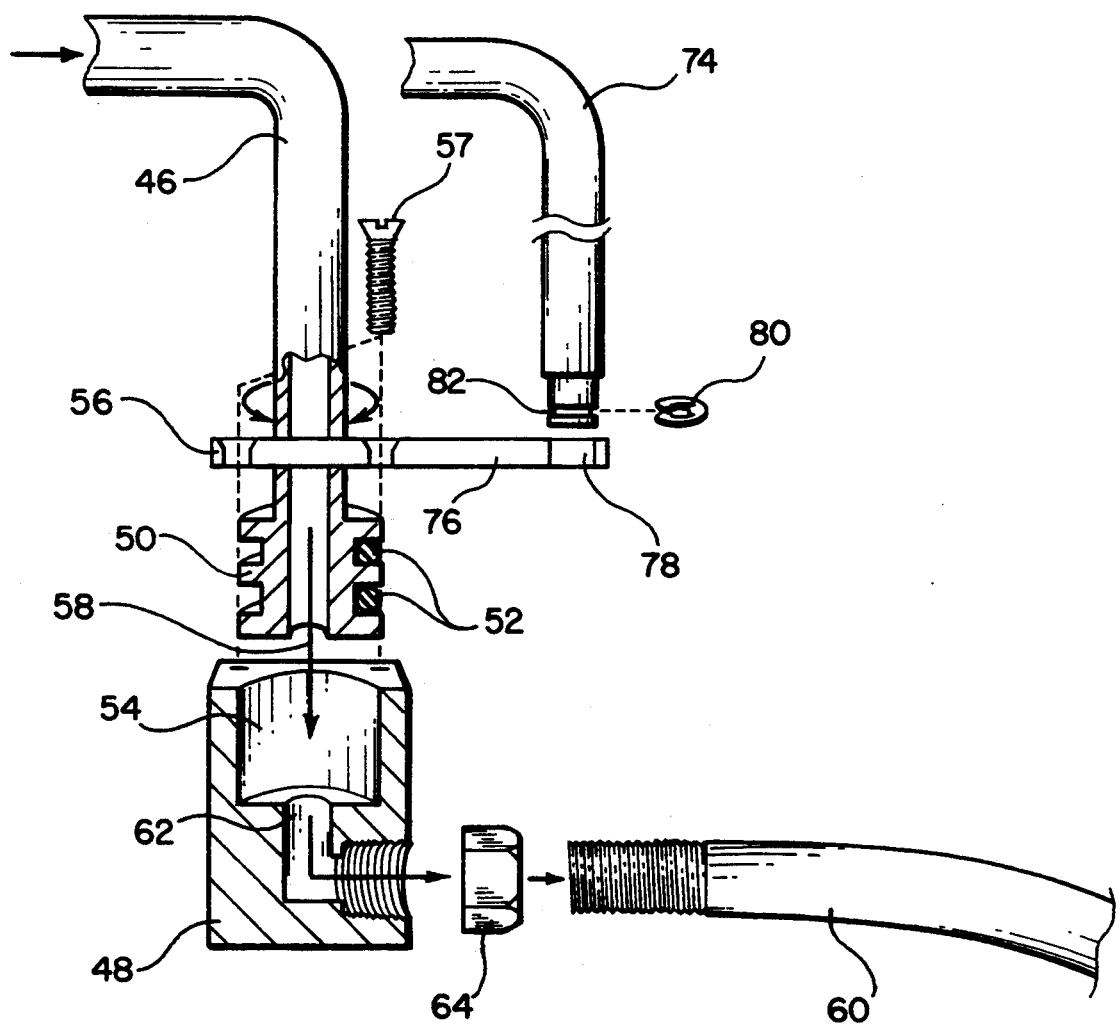
FIG. 5 is a partial, exploded view illustrating the connection of the outlet tube and actuating mechanism to the spray arm.

As best seen in FIGS. 2, 3 and 5, anti-scalding valve assembly 34 has a fluid outlet 44 connected to outlet tube 46, which outlet tube has an end extending over the rim of the toilet bowl 14 into the interior of the bowl. A rotatable union 50 is attached to the end of outlet tube 46, such as by soldering. Housing 48 is pivotally connected to outlet tube 46 by rotatable union 50. Rotatable union 50 may have one or more O-ring seals 52 located therein which sealingly contact the wall 54 forming a chamber defined by housing 48. Once rotatable union 50 is inserted into the chamber defined by housing 48, a cover plate 56 or the like is attached to housing 48 against the upper side of the union 50 by screws 57 to prevent the outlet tube 46 from being axially withdrawn from the housing 48. This connection allows the housing 48 to pivot about axis 58 relative to the outlet tube 46.

Spray arm 60 has one end fixedly attached to housing 48 such that a fluid flow passageway 62 defined by housing 48 communicates with the interior of the hollow spray arm 60. The end of arm 60 may be threadedly engaged into the housing 48 and retained in position via a lock nut 64. The opposite end of spray arm 60 has nozzle 66 affixed thereto, which nozzle may define a plurality of spray holes 68 facing in a generally upwardly direction.

The spray arm 60 and spray nozzle 66 may be moved between a use position, illustrated in solid lines in FIG. 1 and a retracted position, illustrated by dashed lines in FIG. 1. Such movement is accomplished by pivoting housing 48 relative to the outlet tube 46 by a linkage mechanism comprising an elongated rod 70 having a longitudinal axis and slidably mounted to the mounting bracket 24 such that it may slide in the direction of arrows B along its longitudinal axis as illustrated in FIGS. 1 and 2. One end of actuating rod 70 may have knob 72 attached thereto to facilitate its manipulation, while the opposite end of rod 70 is pivotally connected to a connecting link 74. The opposite end of connecting link 74 is attached to arm 76 which extends from cover plate 56 in a direction generally perpendicular to axis 58. The end of rod 74 may be retained in opening 78 defined by arm 76 via a C-clip 80 which engages groove 82 formed in link 74. As is readily apparent, movement of rod 70 in a direction of arrow B will pivot spray arm 60 along with spray nozzle 66 about axis 58 between its retracted and use positions.

A spray shield 84 is connected to bracket 20 via mounting arm 86 such that the shield 84 extends below the rim of toilet bowl 14 and is located above the spray nozzle 66 when the spray arm 60 is in its retracted position. The shape of the shield 84 is such that, when water sprays out of the nozzle holes 68 when the nozzle and spray arm 60 are in their retracted positions, the shield will prevent contact between the sprayed water and the user. This prevents such contact until the water temperature is properly adjusted, at which time the user may move rod 70 so as to move the spray arm 60 and spray nozzle 66 into their use positions.

Figure 6:
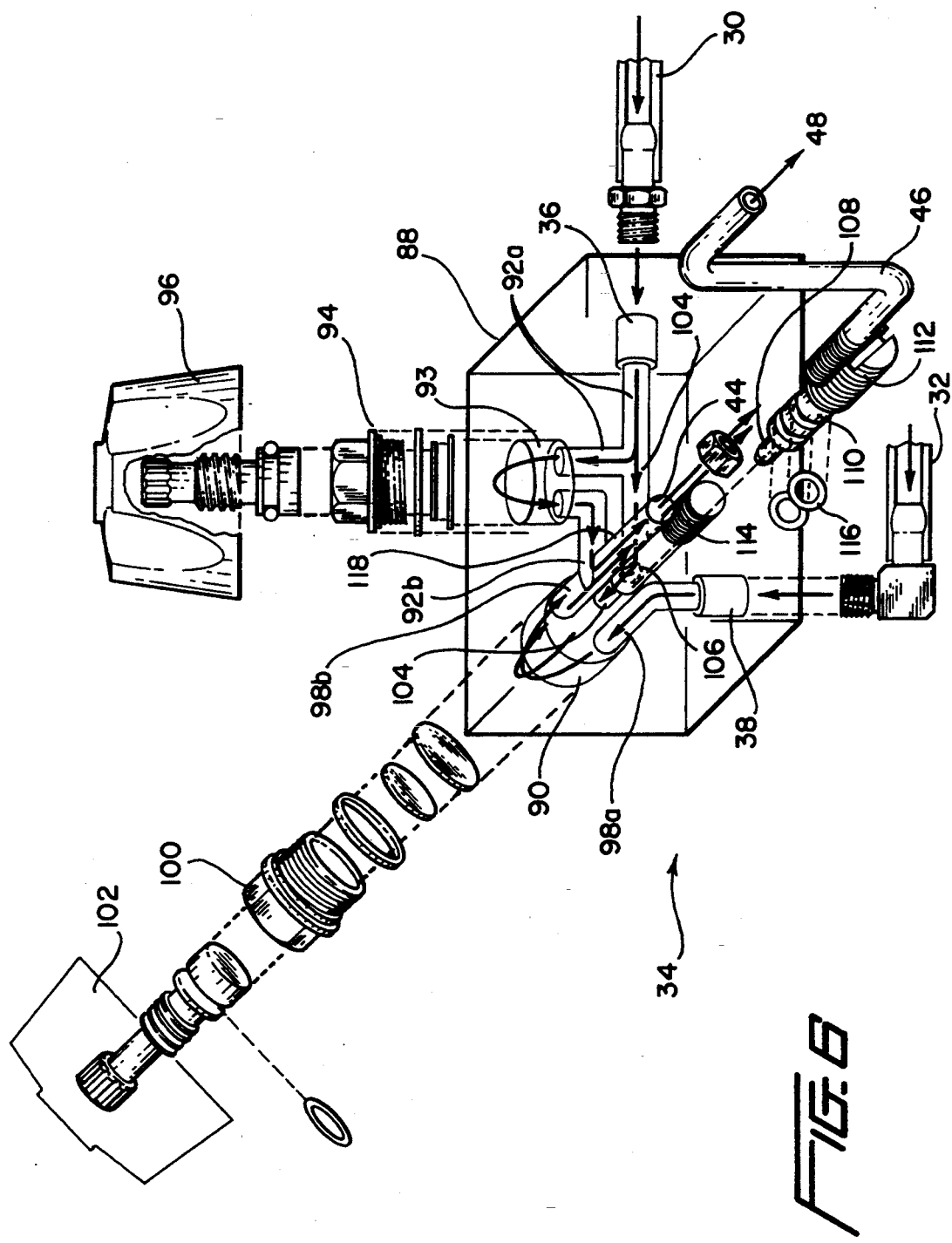
FIG. 6 is a perspective, schematic illustration of the anti-scalding valve assembly according to the present invention.

The operation of the anti-scalding valve 34 will now be described with reference to FIGS. 6–8. Anti-scalding valve 34 may comprise valve body 88 which defines the previously discussed cold water inlet 36, hot water inlet 38 and mixed or cold water outlet 44. Although the valve body 88 is illustrated as having a generally parallelepiped exterior configuration, it is to be understood that it may assume any external configuration without exceeding the scope of this invention.

Valve body 88 defines a cold water control chamber (first control chamber) 93 which communicates with the cold water inlet 36 via cold water inlet conduit 92. Cold water inlet conduit 92 comprises a first portion 92a communicating with the cold water inlet 36 and the inlet of the cold water control chamber 93, and a second portion 92b which communicates with the outlet of the cold water control chamber 93 and the outlet conduit 118. Valve 94 has a manual control knob 96 extending exteriorly of the valve body 88 to facilitate opening or closing the cold water control valve 94 by the user. As best seen in FIG. 7, when cold water control valve 94 is open, the cold water control chamber 93 allows communication between the cold water inlet conduits 92a and 92b thereby enabling cold water to pass directly into the outlet conduit 118.

Valve body 88 also defines a hot water control chamber (a second control chamber) 90 which communicates with the hot water inlet conduit 98. Hot water inlet conduit 98 comprises a first portion 98a communicating with the hot water inlet 38 and the inlet of the hot water control chamber 90, and a second portion 98b which communicates with the outlet of the hot water control chamber 90 and the outlet conduit 118. Hot water control valve 100 has a manual control knob 102 extending exteriorly of the valve body 88 to facilitate opening or closing of this valve by the user. As best seen in FIG. 8, when hot water control valve 100 is opened, the hot water control chamber 90 allows communication between the portions of the hot water inlet conduit 98a and 98b such that hot water may pass directly into the outlet conduit 118.

Since the temperature of the hot water may pose a danger to the user, the valve assembly 34 provides means to reduce the temperature of the water emanating from the outlet conduit 118. This is accomplished by a bypass conduit 104 which extends between the first portion 92a of the cold water inlet conduit upstream of the cold water control valve 94 and hot water control chamber 90. Bypass conduit 104 enables a portion of the cold water to pass directly into the hot water control chamber 90 without the necessity of the cold valve 94 being opened. The hot water is mixed with a portion of the cold water from the bypass conduit 104 within the hot water control chamber 90 and passes out through the outlet conduit 118. Bypass conduit 104 defines a control orifice 106 into which extends a metering rod portion 108 of metering valve 110. Metering valve 110, which may be a needle valve, is threaded into valve body 88 via threads 112 and 114 such that rotation of the metering valve relative to the valve body will cause axial movement of the metering portion 108 with respect to the metering orifice 106. O-ring seals 116 are located on metering valve 110 so as to seal against the valve body 88 and prevent leakage of any water past this valve.

Adjustment of the axial position of the metering portion 108 in orifice 106 will control the amount of cold water bypassing the cold water control valve 94 and passing directly into the chamber 90. Once the needle valve 110 is adjusted for a particular usage (such as by a screwdriver), it need not be further adjusted. The automatic passage of the cold water from the inlet 36 directly into the chamber 90 will temper the hot water entering the hot water control chamber 90 such that the temperature of the water passing through the outlet 44 will always be less than the temperature of the incoming hot water. This will prevent discomfort and/or injury to the user even if the bidet should be used without first turning on the cold water valve 94. Chamber 90 communicates with mixed water outlet 44 via outlet conduit 118.

The foregoing description is provided for illustrative purposes only and should not be construed as in any way limiting this invention, the scope of which is defined solely by the appended claims.

I claim:

1. An anti-scalding mixing valve assembly to limit the temperature of a fluid emanating therefrom comprising:
   a) means defining a cold fluid control chamber and a hot fluid control chamber;
   b) an outlet conduit communicating with a fluid outlet;
   c) a first cold fluid conduit connecting a cold fluid inlet to the cold fluid control chamber;
   d) a second cold fluid conduit connecting the cold fluid control chamber and the outlet conduit;
   e) a first hot fluid conduit connecting a hot fluid inlet to the hot fluid control chamber;
   f) a second hot fluid conduit connecting the hot fluid control chamber and the outlet conduit;
   g) a first control valve operatively associated with the cold fluid control chamber to control the flow of cold fluid into the outlet conduit;
   h) a second control valve operatively associated with the hot fluid control chamber to control the flow of hot fluid into the outlet conduit;
   i) a bypass conduit connecting the hot fluid control chamber and the first cold fluid conduit upstream of the first control valve enabling cold fluid to pass into the hot fluid control chamber without passing through the cold fluid control chamber; and,
   j) a third control valve operatively associated with the bypass conduit to control the flow of cold fluid through the bypass conduit.

2. The anti-scalding valve assembly of claim 1 wherein the third control valve comprises a needle valve.

3. The anti-scalding valve assembly of claim 1 wherein the first and second control valves comprise manually operable valves.

4. The anti-scalding valve assembly of claim 1 further comprising a valve body defining the cold and hot fluid control chambers, the first and second hot and cold fluid conduit and the bypass conduit.

5. The anti-scalding valve assembly of claim 4 wherein the third control valve comprises a metering valve having a flow metering portion and further comprising
   a) means defining a flow control orifice in the bypass conduit; and,
   b) means to movably connect the metering valve to the valve body such that the position of the metering portion with respect to the flow control orifice may be varied to control the cold fluid passing through the bypass conduit.

6. The anti-scalding valve assembly of claim 5 wherein the means to movably connect the metering valve to the valve body comprises:
   a) first threads defined by the valve body; and,
   b) second threads formed on the metering valve so as to engage the first threads whereby rotation of the metering valve relative to the valve body causes axial movement of the metering valve.

* * * * *